United States Patent [19]

Ohmori et al.

[11] Patent Number: 5,182,742
[45] Date of Patent: Jan. 26, 1993

[54] RECORDING AND/OR REPRODUCING APPARATUS WITH A DISC CARTRIDGE TEMPERATURE SENSOR

[75] Inventors: Kiyoshi Ohmori, Kanagawa; Shoji Iwaasa, Tokyo; Goro Fujita, Kanagawa, all of Japan

[73] Assignee: Sony Corporation, Tokyo, Japan

[21] Appl. No.: 726,779

[22] Filed: Jul. 8, 1991

[30] Foreign Application Priority Data

Jul. 10, 1990 [JP] Japan ................... 2-180611

[51] Int. Cl.$^5$ .................. G11B 33/02; G11B 7/00; G11B 33/14
[52] U.S. Cl. .................. 369/116; 369/33; 369/77.2; 360/97.02
[58] Field of Search ............ 369/116, 291, 77.2, 369/270, 100, 120, 54, 58, 292, 275.1, 272, 288, 291, 77.02, 33; 360/131, 132, 133, 135, 97.02, 97.03, 97.04

[56] References Cited

U.S. PATENT DOCUMENTS

| 3,723,980 | 3/1973 | Gabor | 360/97.02 |
| 4,695,912 | 9/1987 | Moriwaki | 360/133 |
| 4,799,114 | 1/1989 | Tsunashima | 360/135 |
| 4,858,219 | 8/1989 | Yoshikawa | 369/54 |

FOREIGN PATENT DOCUMENTS 0039717 4/1978 Japan ................... 360/97.02

*Primary Examiner*—Aristotelis Psitos
*Assistant Examiner*—Nabil Hindi
*Attorney, Agent, or Firm*—Limbach & Limbach

[57] ABSTRACT

A recording and/or reproducing apparatus into which a disc cartridge accommodating a disc is loaded and in which information signals are adapted to be recorded on or reproduced from the disc. A temperature sensor is provided within the apparatus for contacting with and sensing the temperature of the disc cartridge. By this temperature sensor, the temperature of the loaded disc cartridge is sensed and an output of a light source of an optical head is controlled on the basis of the sensor output to effect recording and/or reproduction of the information signals under an optimum operating state.

15 Claims, 6 Drawing Sheets

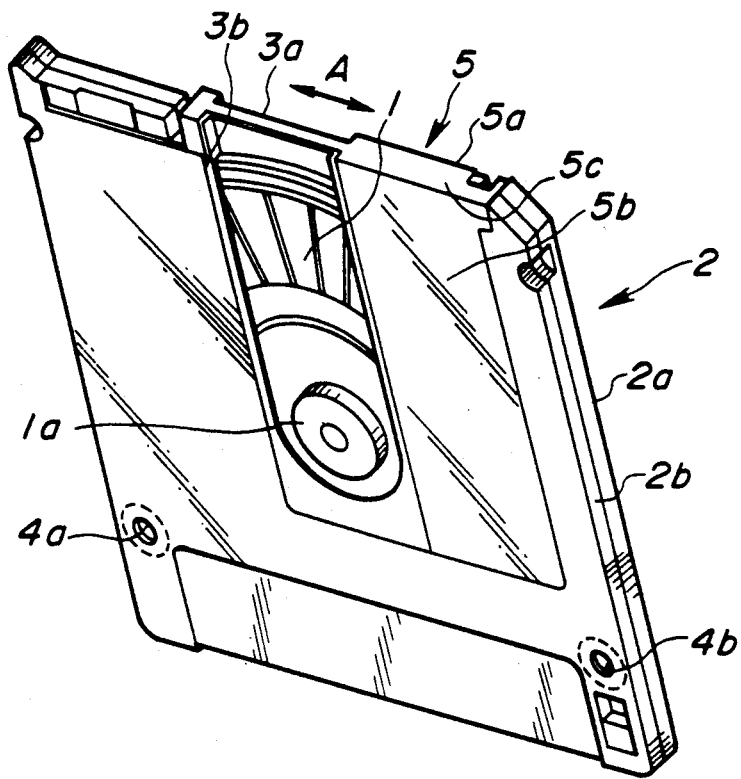
FIG. 2
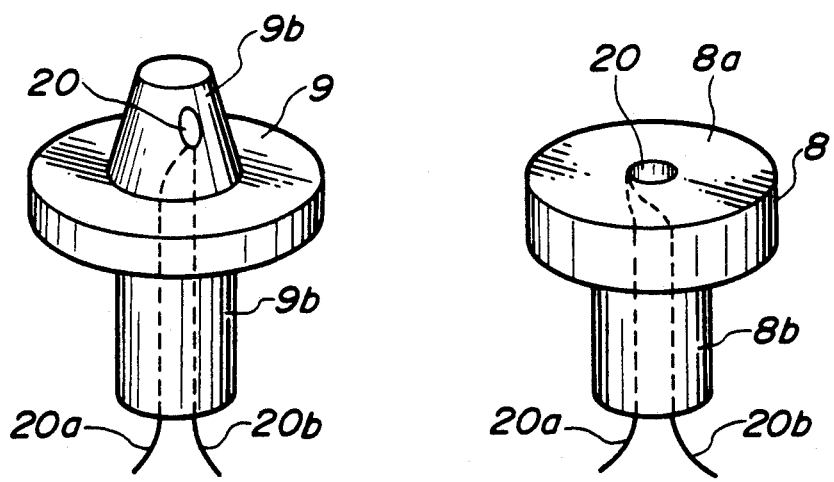
FIG. 3  FIG. 5

RECORDING AND/OR REPRODUCING APPARATUS WITH A DISC CARTRIDGE TEMPERATURE SENSOR

BACKGROUND OF THE INVENTION

1. Field of the Invention

This invention relates to a recording and/or reproducing apparatus in which a disc cartridge having a disc-shaped recording medium for writing and/or reading information signals accommodated in a cartridge proper is loaded and in which recording and/or reproduction of the information signals is effected on or from the recording medium in the disc cartridge. More particularly, it relates to a recording and/or reproducing apparatus provided with a temperature sensor for sensing the temperature of a disc cartridge loaded therein, and to a disc cartridge loaded into a recording and/or reproducing apparatus for sensing the temperature of a recording medium accommodated within a cartridge proper.

2. Description of the Prior Art

In a recording medium adapted for recording and/or reproducing information signals by magnetic, optical or photomagnetic means, the temperature of the recording medium during writing or reading is crucial since it influences recording and reproduction significantly.

In the case of a magneto-optical disc, for example, a high laser power is required during recording or erasure because the temperature of a magnetic thin film needs to be raised to higher than a Curie temperature, while a lower laser power is required during reproduction for which the recorded information is not demagnetized. These laser powers need to be determined as a function of the temperature of the recording medium that is, it needs to be set to a value which will allow for optimum recording or reproduction of information signals. For example, it may occur that, even if the recording laser power is set to an optimum value for a certain temperature of the recording medium, the recording laser power may become too high or too low due to changes in the recording medium temperature, such that the direction of magnetization cannot be inverted satisfactorily. Similarly, if the laser power during the reproduction or erasure is too high or too low, it may occur that the recorded information signals are demagnetized or are not erased completely.

The conventional practice for sensing the temperature of the recording medium is to provide the cartridge proper with a small orifice through which the recording medium temperature is sensed by means of a radiation thermometer provided in the recording and/or reproducing apparatus to permit a laser to be radiated at an optimum laser power as a function of temperature changes of the recording medium.

However, in this case, fine dust and dirt may intruded through the orifice into the inside of the cartridge to cause errors in information signals to which interfere with recording or reproduction. Although the orifice may be stopped when not in use, it becomes necessary to provide a member for stopping the orifice and means for permitting the sliding of the member, as well as driving means for sliding the member on the recording and/or apparatus, resulting in an increased number of component items and increased costs. On the other hand, the temperature of an order of 30° to 40° C. can not be measured accurately with a radiation thermometer.

There has also been proposed by the Japanese Patent KOKAI Publication No. 1-191329(1989) an arrangement in which a temperature sensor for sensing the temperature of a recording medium is mounted integrally on an optical head and adapted to be moved therewith radially of the recording medium for sensing the temperature of the recording medium.

However, in this case, the temperature of the recording medium can not be measured accurately by reason of a gap between the temperature sensor and the recording medium. Thus a laser beam cannot be irradiated at an optimum laser power as a function of the prevailing temperature of the recording medium, so that information signals cannot be recorded satisfactorily.

OBJECT AND SUMMARY OF THE INVENTION

It is an object of the present invention to provide a recording and/or reproducing apparatus adapted for sensing the temperature of a disc cartridge loaded therein.

It is another object of the present invention to provide a recording and/or reproducing apparatus whereby the temperature of the recording medium of the loaded disc cartridge may be sensed accurately and recording and/or reproduction may be made under an optimum condition based on the thus sensed temperature.

It is yet another object of the present invention to provide a disc cartridge adapted for sensing the temperature of a recording medium accommodated within a cartridge proper.

A recording and/or reproducing apparatus according to the present invention is provided, within the inside thereof, with a temperature sensor adapted for contacting with a disc cartridge loaded therein for sensing the temperature of the disc cartridge.

A recording and/or reproducing apparatus according to the present invention is provided with a temperature sensor for sensing the temperature of the disc cartridge on a member adapted for contacting with a disc cartridge loaded therein.

A disc cartridge according to the present invention includes a disc-shaped recording medium rotatably accommodated within a cartridge proper which has its outer surface formed at least partially of the same material as that of the recording medium which recording medium includes a recording layer formed on a substrate for writing and/or reading information signals.

A recording and/or reproducing apparatus according to the present invention includes a disc cartridge loaded therein for recording and/or reproducing information signals on or from a recording medium of the disc cartridge, and a temperature sensor mechanism adapted for contacting with a region of the disc cartridge formed of the same material as that of the substrate of the recording medium for sensing the temperature of the region of the disc cartridge.

The recording and/or reproducing apparatus, provided in one aspect of the present invention, includes a temperature sensor which, when a disc cartridge comprised of a disc-shaped recording medium accommodated in a cartridge proper is loaded in the apparatus, is brought into contact with the cartridge proper to sense its temperature so that the temperature of the cartridge proper may be determined instantaneously.

In addition, the recording and/or reproducing apparatus, provided in one aspect of the invention, includes a temperature sensor provided on a member contacting with the cartridge proper for sensing the temperature of the cartridge proper, so that the temperature of the cartridge proper may similarly be determined on loading the disc cartridge in the recording and/or reproducing apparatus.

With a disc cartridge, provided in another aspect of the present invention, at least a portion of the outer surface of the cartridge proper is formed of the same material as the material of the substrate of the recording medium. When the disc cartridge is loaded in a recording and/or reproducing apparatus provided in a third aspect of the invention, a temperature sensor mechanism provided in the recording and/or reproducing apparatus is brought into contact with the portion of the cartridge proper formed of the same material as the substrate material for sensing its temperature. The temperature thus sensed is approximately equal to the temperature of the recording medium, because the portion is of the same material as the substrate material. Hence, with the disc cartridge of the present invention, the temperature of the recording medium accommodated within the cartridge proper may be grasped by sensing the temperature of the cartridge proper.

Since no orifice for temperature detection is provided in the present disc cartridge, the recording medium may be safeguarded against contamination by foreign matter such as dust and dirt.

With the recording and/or reproducing apparatus, provided in the third aspect of the invention, since the temperature sensor mechanism is provided therein for contacting with and sensing the temperature of the portion of the cartridge proper formed of the same material as the material of the substrate of the recording medium, the temperature of the portion of the cartridge proper may be grasped instantaneously.

BRIEF DESCRIPTION OF THE DRAWINGS

FIG. 2 is a perspective view showing an example of a disc cartridge loaded in the apparatus.

FIG. 3 is an enlarged perspective view showing a positioning pin in the interior of which a temperature sensor is provided.

FIG. 5 is an enlarged perspective view showing a height reference pin in the interior of which a temperature sensor is provided.

DETAILED DESCRIPTION OF PREFERRED EMBODIMENTS

Figure 1:
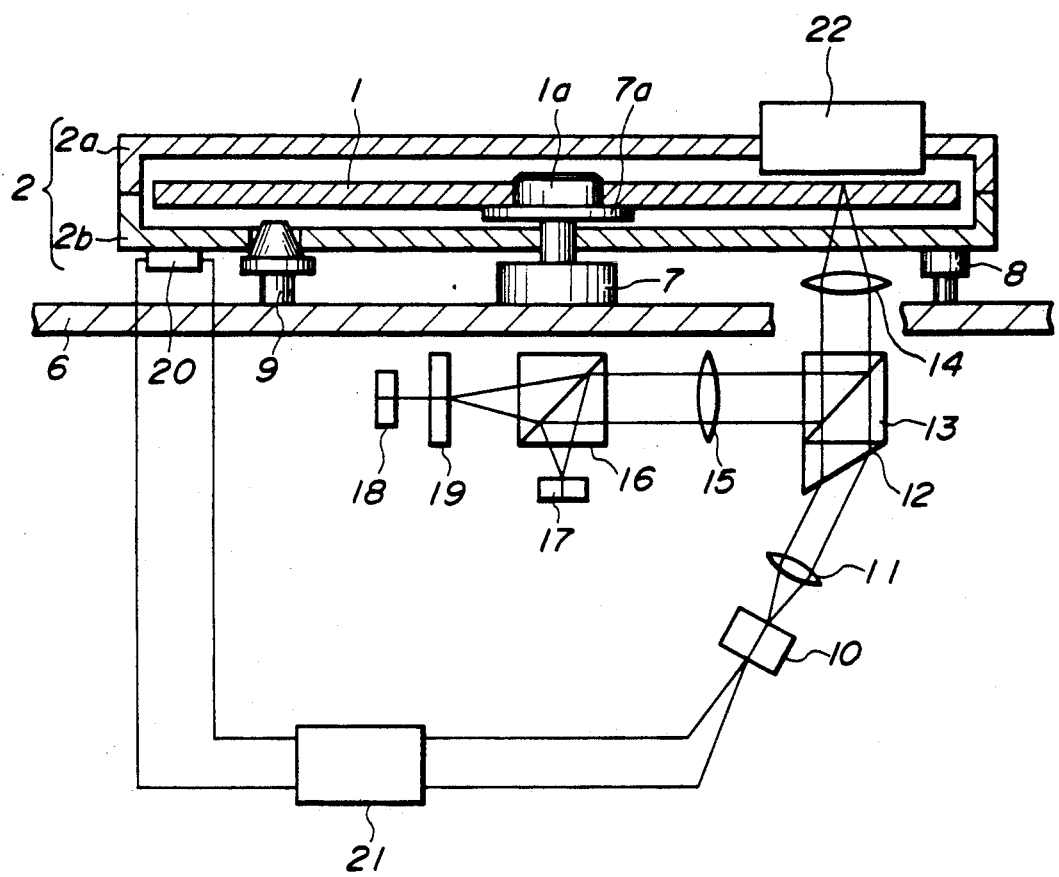
FIG. 1 is a schematic view showing an example of a recording and/or reproducing apparatus in one aspect of the present invention.

By referring to the drawings, certain preferred embodiments of the present invention will be explained in detail.

In the first place, a disc cartridge loaded on a recording and/or reproducing apparatus according to a first embodiment of the present invention will be explained.

Referring to FIG. 2, the disc cartridge includes a disc 1 as a disc-shaped recording medium and a cartridge proper 2 rotatably accommodating the disc 1. The disc 1 is constituted by a substrate and a recording layer formed thereon for writing and/or reading information signals.

The disc 1 is an optical disc, a magneto-optical disc or a floppy disc, for example, having a recording layer on at least one surface, and information signals may be written and/or read on or from the recording layer by optical or magneto-optical means. A chucking hub 1a is provided at the center of the disc 1 for chucking the disc 1 on a disc table provided in the recording and/or reproducing apparatus, which will be explained subsequently.

The cartridge proper 2 is constituted by rectangular casings, that is, an upper half 2a and a lower half 2b, of a size to accommodate the disc 1 therein. The upper half 2a and the lower half 2b are formed of the same polycarbonate resin as that of the substrate of the disc 1 and are abutted and connected to each other to make up the cartridge proper 2. The disc 1 is accommodated rotatably within the so-assembled cartridge 2.

The upper half 2a and the lower half 2b are formed with rectangular apertures 3a, 3b, respectively, extending towards the middle from a side edge of the cartridge proper 2 by which the disc cartridge is loaded in the recording/reproducing apparatus. By these apertures 3a and 3b, the disc 1 accommodated within the cartridge proper 2 and the chucking hub 1a are exposed to the outside throughout its inner and outer peripheries. Of the upper and lower halves 2a and 2b, the lower half 2b is formed with positioning holes 4a, 4b in which are engaged positioning pins, not shown, provided on the recording/reproducing apparatus.

The cartridge proper 2 is provided with a shutter member 5 which is movable relative to the cartridge 2 and adapted for opening or closing the apertures 3a and 3b. The shutter member 5 is a thin sheet of metal or synthetic resin in the shape of a letter U for clamping the front side of the cartridge 2 from the upper and lower sides thereof. That is, the shutter member 5 is made up of an upper plate section 5a facing the major surface of the upper half 2a, a lower plate section 5b facing the major surface of the lower half and a front plate section 5c interconnecting the upper and lower plate sections.

The shutter member 5 has its front plate section 5c supported by a front side edge of the cartridge proper 2 is movable along the front side edge of the cartridge proper 2 as shown by an arrow A in FIG. 2. Except when the shutter member 5 is loaded on a drive device, the shutter member is biased by a torsion coil spring mounted within the cartridge proper 2 for closing the apertures 3a and 3b. Hence, under the normal state, the disc 1 is protected by the shutter member 5 against accidental external force or intrusion of dust and dirt into the cartridge 2.

An embodiment of the recording/reproducing apparatus, into which the above disc cartridge is loaded for recording and/or reproducing on or from the disc 1 of the disc cartridge, is hereinafter explained.

In the present embodiment, the recording/reproducing apparatus is explained as an apparatus for recording/reproducing information signals on or from a magneto-optical disc.

In the present apparatus, shown in FIG. 1, a spindle motor 7 adapted for chucking and rotating the disc 1 accommodated in the cartridge proper 2 is provided on a chassis 6. On the foremost part of the spindle motor 7, there is mounted a disc table 7a for attracting the chucking hub 1a of the disc 1 for rotatably supporting the disc 1. On the chassis 6, there is provided height position setting pin 8 supporting the cartridge 2 to prevent the disc 1 loaded on the disc table 7a from abutting on the cartridge 2 when the cartridge 2 is loaded on the recording/reproducing apparatus. The height position setting pin 8 is adapted for supporting the vicinity of the side edge of the lower half 2b on the front side thereof provided with the shutter member 5.

On the chassis 6, there is additionally provided a positioning pin 9 for fixing the relative position between the disc 1 and the spindle motor 7 for assuring stable rotation of the disc 1. The position setting pin 9 is provided on the opposite side of the height reference pin 8 with the spindle motor 7 in between. The pins 8 and 9 are inserted into positioning pins 4a and 4b provided in the lower half 2b of the cartridge proper 2 for controlling the positioning of the cartridge proper 2. In this state, the disc 1 accommodated within the cartridge proper 2 is loaded on the disc table 7a and raised from the inner surface of the lower half 2b out of collision with the cartridge proper 2 so as to be rotated within the cartridge proper 2.

The apparatus is provided with an optical head adapted for writing and reading information signals on or from the disc 1 accommodated within the cartridge proper 2. The optical head is constituted by a semiconductor laser 10, an optical system, made up of a collimator lens 11, a beam shaping prism 12, a polarization beam splitter 13 and an object lens 14 and adapted for irradiating a laser beam from the semiconductor laser 10 in the form of a predetermined small sized spot in the disc 1, and a servo system, made up of a sensor lens 15, a beam splitter 16, a servo sensor 17, a signal sensor 18 and a polarization plate 19 and adapted for driving the object lens 14 on the basis of signals from the light reflected from the disc 1 for focusing and tracking.

Thus the laser beam radiated from the semiconductor laser 10 is collimated by a collimator lens 11 and transmitted through beam shaping prism 12 and polarization beam splitter 13 so as to form a small sized spot on the disc 1 (magneto-optical disc) by means of the object lens 14. The light reflected from the magneto-optical disc is transmitted through the object lens 14 and split by beam splitter 16 into two lights which are separately converged on the servo sensor 17 and the signal sensor 18. The polarization plate 19 is provided ahead of the signal sensor 18 for converting changes in the polarization state by photomagnetic effects into intensity modulation. The servo sensor 17 detects focusing and tracking signals in any known manner, such as by an astigmatic method or a push-pull method. The detected servo signals are fed back to a lens actuator to drive the object lens 14 to effect automatic focusing and automatic focusing.

In the present apparatus, a temperature sensor 20 for contacting with the cartridge 2 for sensing its temperature is provided on the chassis 6. The temperature sensor 20 is provided in proximity to the positioning pin 9 and adapted to contact with the cartridge proper 2 on loading the cartridge proper 2. That is, when the cartridge proper 2 is supported by the height reference pin 8 provided on the chassis 6, and is position-controlled by the positioning pin 9, the temperature sensor 20 is adapted to contact the lower half 2b of the cartridge proper 2.

Meanwhile, a central processing unit 21 is connected to the temperature sensor 20, and the temperature sensed by the temperature sensor is transmitted to the central processing unit 21. In the unit 21, the power of the laser light radiated from the semiconductor laser 10 is controlled on the basis of the sensed temperature from the temperature sensor 20.

For writing information signals on the disc 1 in the above described recording and/or reproducing apparatus, a bias magnetic field is impressed on the disc 1 by a magnetic head 22, facing the object lens 14 with the disc 1 in-between, at the same time that a laser beam is radiated by the semiconductor laser 10 for converging the laser beam at a recording region.

The laser beam at this time is controlled by the central processing unit 21, based on the temperature sensed by the temperature sensor 20 contacting the disc cartridge proper 2, that is, the temperature approximately equal to that of the disc 1, so that the beam in outputted at an optimum recording power. If the disc temperature is changed as a function of occasional recording regions of the disc 1, the disc cartridge temperature is instantly sensed by the temperature sensor 20, whereby the laser light is outputted at an optimum recording power on the basis of occasional changes, in the disc cartridge temperature.

For reproduction and erasures, the laser light is irradiated at all times on the recording surface of the disc 1 at an optimum laser power as a function of the disc temperature. Thus there is no risk of demagnetization of the recorded information or incomplete erasure, so that satisfactory data recording and/or reproduction is assured.

Also, in the case of an optical disc, an optimum laser power required for recording or reproduction may be outputted, depending on occasional changes in the disc temperature, so that fluctuations in the pit size are not concomitantly produced, so that stable recording/reproducing, is assured.

In the above described embodiment, the laser power is controlled on the basis of the sensed disc cartridge temperature, it is also possible to control the readout position of recording signals for the magnetic head 22 based on the sensed temperature. In this case, a sensor for sensing the temperature within the apparatus may be separately provided in the apparatus and positioning of the magnetic head 22 may be effected on the basis of the temperature difference between the temperature detected by the sensor and the temperature sensor 20.

Figure 4:
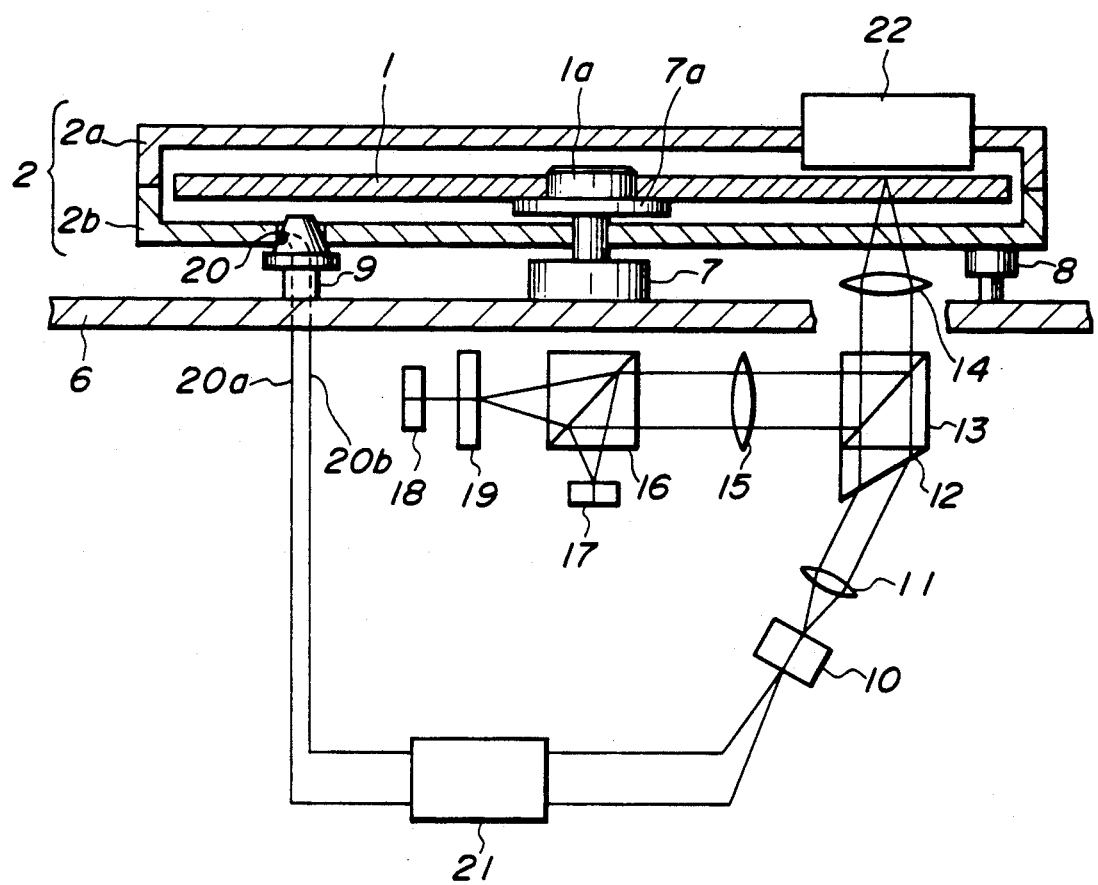
FIG. 4 is a schematic view showing a recording and/or reproducing apparatus in which the cartridge temperature is sensed by the temperature sensor provided within the positioning pin.

Although the temperature sensor 20 is provided on the chassis 6, the sensor 20 may also be provided within an inner recess of the positioning pin 9. That is, the sensor 20 is embedded within an inner recess of a positioning part 99 of the positioning pin 9 contacting with the inner periphery of one of the positioning holes 4a, 4b so that the main body of the sensor is exposed to the outer surface of the positioning part 9a, while terminals 20a, 20b of the temperature sensor 20 are led out at a terminal of a shank part 9b attached to the chassis 6 and connected to the CPU 21 as shown in FIG. 4.

In this manner, when the cartridge proper 2 is loaded and the positioning pin 9 is engaged in the positioning holes 4a in the lower half 2b, the temperature sensor 20 provided within the positioning pin 9 is brought into contact with the inner periphery of the positioning holes 4a or 4b for sensing the temperature of the cartridge proper 2. Based on the sensed temperature, a laser light with the optimum laser power controlled by the CPU 21 may be outputted, or the readout position of the recording signals by the magnetic head may be controlled.

Alternatively, the temperature sensor 20 may also be provided within an inner recess of the height position setting pin 8. To this end, the sensor 20 is embedded within the interior of a supporting part 8a contacting with the cartridge proper 2 so that the main body of the sensor 20 is exposed on the outer surface of the supporting part 8a. As in the case of the positioning pin 9, the terminals 20a, 20b of the temperature sensor 20 are led out at a terminal of a shank part 8b secured to the chassis 6.

It is noted that, when the temperature sensor 20 is provided within the inner recess of the pin 8 or 9, these pins may be formed of a material having good head conductivity, such as glass or copper, to assure more reliable detection of the cartridge temperature.

Figure 6:
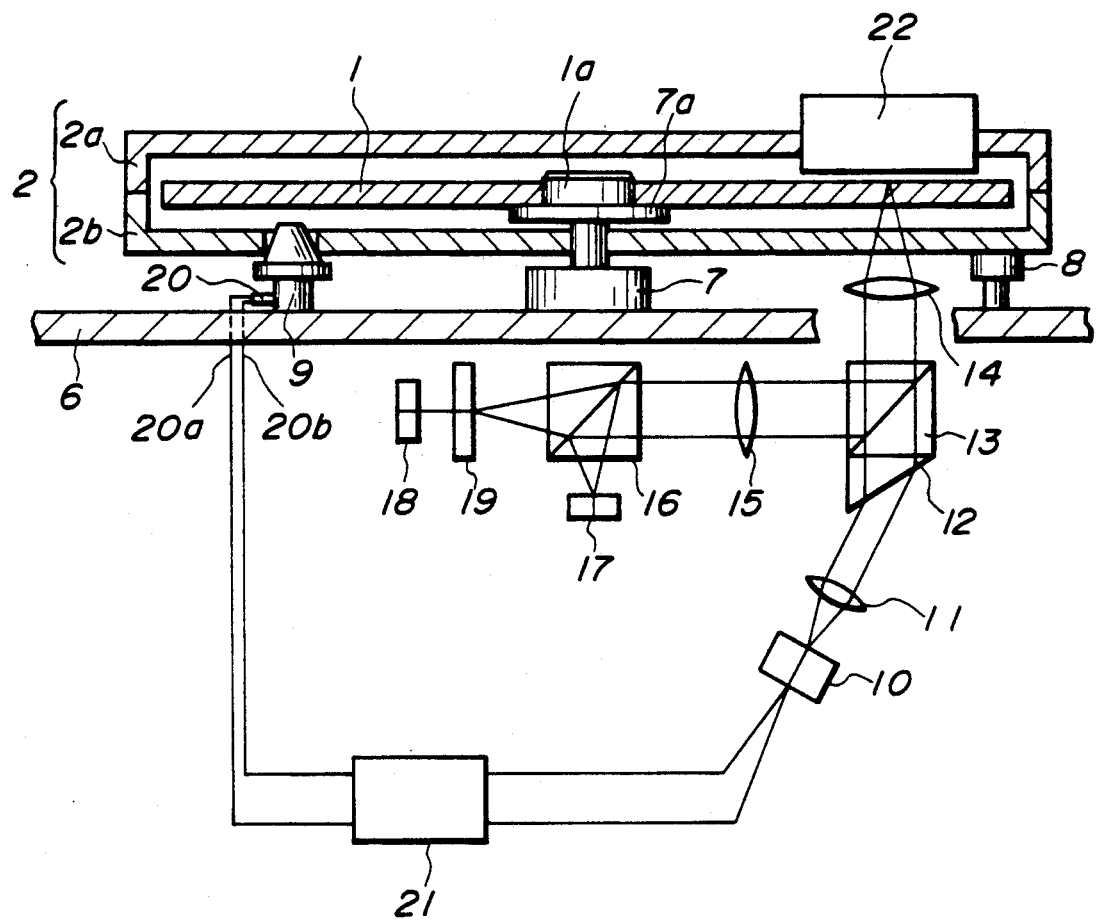
FIG. 6 is a schematic view showing a recording and/or reproducing apparatus in which the temperature sensor is contacted with the positioning pin for sensing the cartridge temperature.

Alternatively, the positioning pin 9 may be formed of a material exhibiting good heat conductivity, and the temperature sensor 20 may be directly contacted with the positioning pin 9, as shown in FIG. 6.

The temperature sensor 20 may be provided at any other member than the positioning pin 9 which may be contacted with the cartridge proper 2. For example, the temperature sensor may be contacted with the height reference pin 8 or a shutter opening/closing pin for opening or closing the shutter member 5. In this case, the height reference pin 8 or the shutter opening/closing pin need to be formed of a material exhibiting good heat conductivity. In this manner, the same result as that when the temperature sensor 20 is provided within the interior of the pin 9 or 8 may be achieved.

With the above described arrangement, the cartridge proper of the disc cartridge and the transparent substrate of the disc 1 are not necessarily formed of the same material. The cartridge proper in general is formed from synthetic resin, such as ABS resin, whereas the transparent substrate of the disc 1 is formed of polycarbonate resin or polymethyl methacrylate (PMMA), so that temperature characteristics, for example, of these materials differ from each other. Hence, some error is introduced if the temperature of the cartridge proper of the disc cartridge is sensed. In the following, description is made of second and third embodiments of the present invention, in which this problem may be overcome to assure more accurate detection of disc temperatures.

Figure 7:
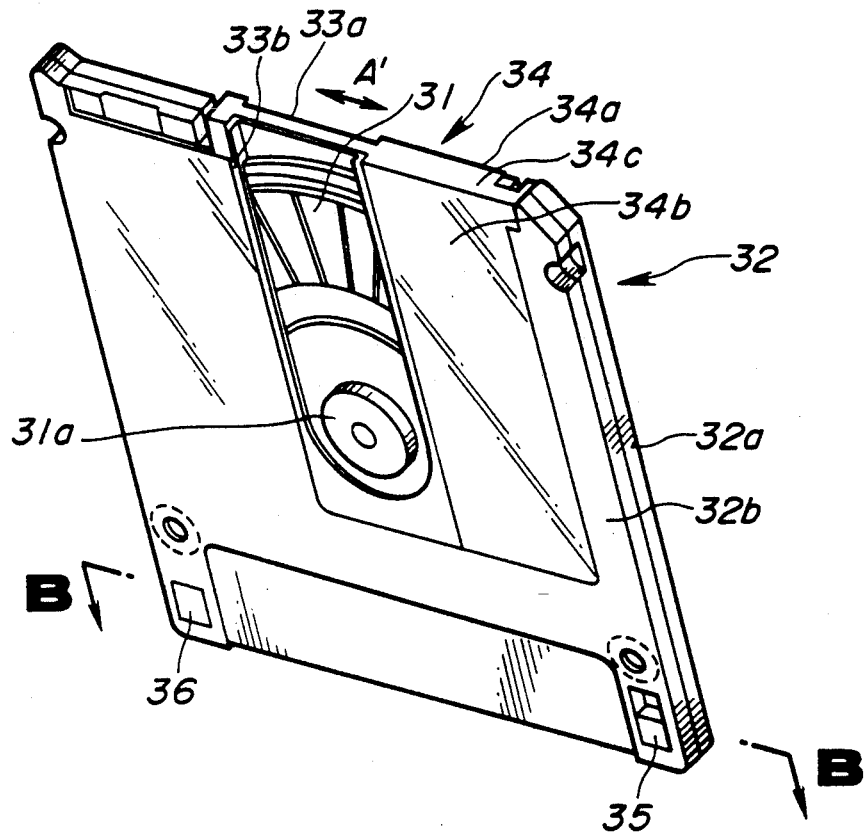
FIG. 7 is a perspective view showing an example of a disc cartridge in a second aspect of the invention.
Figure 8:
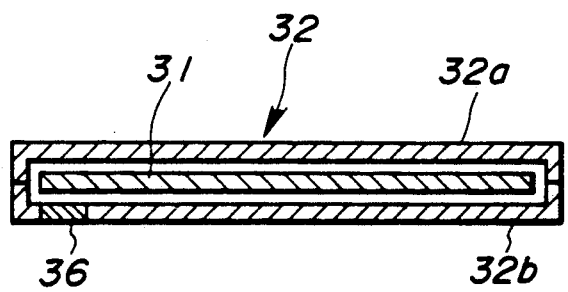
FIG. 8 is a cross-sectional view taken along line B—B in FIG. 7.

A disc cartridge according to the second embodiment is shown in FIGS. 7 and 8 and is comprised of a disc 31, as a disc-shaped recording medium, and a cartridge proper 32 rotatably accommodating the disc 31, which is comprised of a substrate and a recording layer formed thereon for reading and/or writing information signals. The disc 31 is an optical disc, a magneto-optical disc or a floppy disc, for example, having a recording layer on at least one surface, and information signals may be written and/or read on or from the recording layer by optical or magneto-optical means. A chucking hub 31a is provided at the center of the disc 31 for chucking the disc 31 on a disc table provided in the recording and/or reproducing apparatus, which will be explained subsequently.

The cartridge proper 32 is constituted by rectangular casings, that is, a upper half 32a and a lower half 32b, of a size the accommodate the disc 31 therein. The upper half 32a and the lower half 32b are abutted and connected to each other to make up the cartridge proper 32. The disc 31 is accommodated rotatably within the so-assembled cartridge proper 32.

The upper half 32a and the lower half 32b are formed with rectangular apertures 33a, 33b, respectively, extending towards the middle from a side edge of the cartridge proper 32 by which the cartridge is loaded on the recording/reproducing apparatus. By these apertures 33a and 33b, the disc 31 accommodated within the cartridge proper 2 and the chucking hub 31a are exposed to outside throughout its inner and outer peripheries. It is noted that a chucking hub 31a provided centrally of the disc 31 also is exposed to outside by these apertures 33a, 33b.

The cartridge proper 32 is provided with a shutter member 34 which is movable relative to the cartridge proper 32 and which is adapted for opening or closing the apertures 33a and 33b. The shutter member 34 is a thin sheet of metal or synthetic resin in the shape of a letter U for clamping the front side of the cartridge proper 32 from the upper and lower sides thereof. That is, the shutter member 34 is made up of an upper plate section 34a facing the major surface of the upper half 32a, a lower plate section 34b facing the major surface of the lower half 32b and a front plate section 34c interconnecting the upper and lower plate sections.

The shutter member 34 has its front plate section 34c supported by the front side of the cartridge proper 32 and is movable along the front side of the cartridge proper 32 as shown by an arrow A in FIG. 2. Except when the shutter member 34 is loaded on a recording/reproducing apparatus, the shutter member is biased by a torsion coil spring, not shown, mounted within the cartridge proper 32 for closing the apertures 33a and 33b. Hence, under the normal state, the disc 31 is protected by the shutter member 34 against an external force or intrusion of dust and dirt into the cartridge proper 32.

With the present disc cartridge, for detecting the temperature of the disc 31 accommodated within the cartridge proper 32, a sensed region 36 formed of the same material as that of the disc substrate, that is a transparent substrate of an optical disc or a magneto-optical disc or a resilient substrate of a floppy disc, is provided in the vicinity of a side edge of the lower half 32a opposite to the side edge provided with an inadvertent erasure inhibit button 35.

The sensed region 36 is formed integrally with the lower half 32b and provided at a position in register with a temperature sensor mechanism provided in the recording and/or reproducing apparatus which will be explained subsequently. Thus the sensed region 36 is formed of the same material as that of the disc substrate by two-color molding so that the sensed region of the lower half 32b in contact with the temperature sensor mechanism presents a different color from that of the main portion of the lower half. In the present embodiment, the sensed region 36 is formed of a polycarbonate resin, as is the substrate of the disc 31.

The above mentioned temperature sensor mechanism is adapted to contact with the sensed region 36 for instantly detecting the temperature of the sensed region. The sensed temperature is the same as the temperature of the disc 31 inasmuch as the sensed region 36 is of the same material as that of the disc 31. In other words, by sensing the temperature of the sensed region 36, the temperature of the disc 31 may be determined instantaneously.

In the present embodiment, a region of the lower half in contact with the temperature sensor mechanism is formed with a different color from the main region of the lower half by two-color molding so as to be used as the sensed region 36. However, the lower half 32a in its entirely may be formed of the same material as that of the substrate of the disc 31. Still alternatively, a chip formed of the same material as the disc substrate may also be applied to that region of the outer surface of the lower half 32b which is in contact with the temperature sensor mechanism.

In the following, a recording and/or reproducing apparatus, into which the above described disc cartridge is loaded and in which information signals are recorded or reproduced on or from the disc 31 of the disc cartridge, according to the present invention, is explained. It is noted that the apparatus is adapted for recording or reproducing the information signals on or from a magneto-optical disc.

Figure 9:
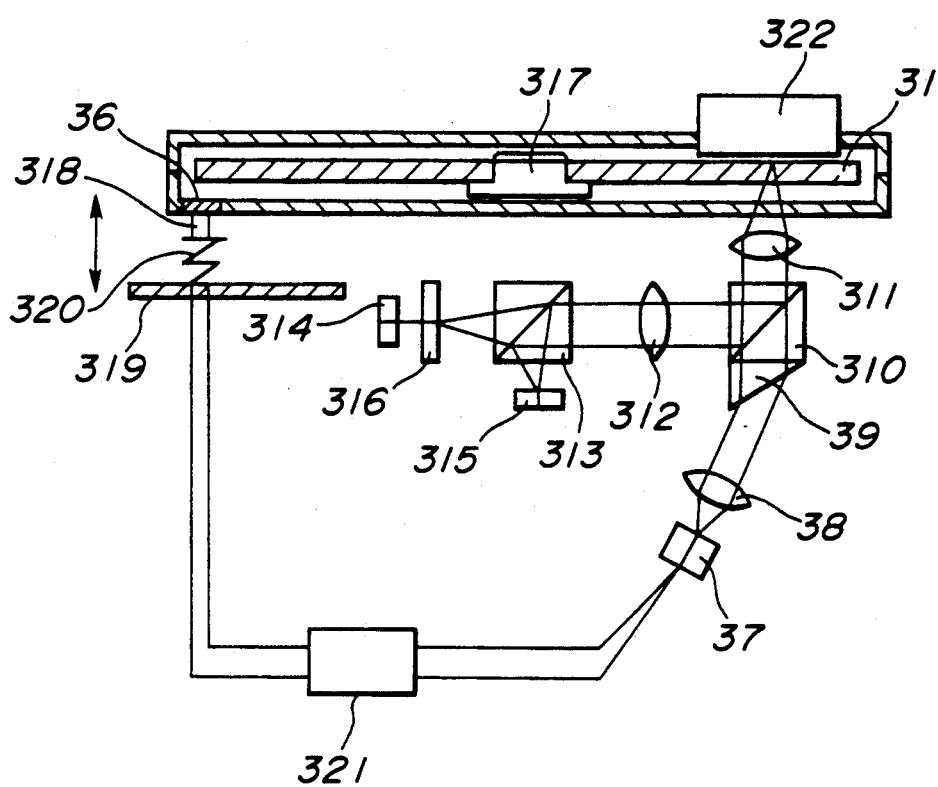
FIG. 9 is a schematic view showing an example of a recording and/or reproducing apparatus in a third aspect of the invention.

In the present apparatus, as shown in FIG. 9, a laser beam radiated from a semiconductor laser is collimated by a collimator lens 38 and transmitted through a beam shaping prism 39 and a polarization beam splitter 310 so as to be converged by an object lens 311 to form a small-sized spot on the disc 31, that is a magneto-optical disc. The light reflected from the magneto-optical disc is again transmitted through the object lens 311 and reflected by the polarization beam splitter 310 so as to be separated from an incident light on the recording medium. The reflected light or return light is transmitted through a sensor lens 312 and split by beam splitter 313 into two lights which are separately converged on a signal sensor 314 and a servo sensor 315. A polarization plate 316 is provided ahead of the signal sensor 314 for converting changes in the polarization state by photomagnetic effects into intensity modulation. The servo sensor 315 detects focusing and tracking signals in any known manner, such as by an astigmatic method of a push-pull method. The detected servo signals are fed back to a lens actuator, not shown, to drive the object lens 311 to effect automatic focusing and automatic focusing.

A chucking hub 31a of the disc 31 accommodated in the cartridge proper 32 of the disc cartridge is engaged with a spindle motor 317 provided in the recording and/or reproducing apparatus to cause rotation of the disc 31 in unison with the spindle motor 317.

In register with a sensed region 36 provided on the cartridge proper 32 of the disc cartridge, there is provided a temperature sensor unit 318, which is a temperature sensor mechanism adapted for contacting with the sensed region 36 for sensing the temperature of the sensed region 36. The temperature sensor unit 318 is provided at the distal end of a compression spring 320 provided on a chassis 319 of the main body of the recording/reproducing apparatus so that the temperature sensor unit 318 may be moved vertically towards and away from the sensed region 36 during loading of the disc cartridge. More specifically, before loading of the disc cartridge, the spring 320 is in its fully extended state. On completion of the loading the sensor unit 318 is pressed by the cartridge proper 32, so that the spring 320 is in its compressed state. In short, the temperature sensor unit 318 is pressed by the spring 320 into pressure abutment with the sensed region 36 provided on the cartridge proper 32.

Meanwhile, a central processing unit 321 is connected to the temperature sensor unit 318, and the temperature as sensed by the temperature sensor unit 318 is transmitted to the central processing unit 321. The central processing unit 321 is provided with a laser drive control circuit whereby the power of the laser light radiated from the semiconductor laser 37 is controlled on the basis of the sensed temperature from the temperature sensor unit 318.

For writing information signals on the disc 31 in the above described recording and/or reproducing apparatus, a bias magnetic field is impressed on the disc 31 by a magnetic head 322, facing the object lens 311 with the disc 31 in-between, at the same time that a laser beam is radiated by the semiconductor laser 37 for converging the laser beam in a recording region. The laser beam at this time is controlled by the central processing unit 321 on the basis of the temperature of the sensor 36 of the cartridge proper 32 as measured by the temperature sensor unit 318 provided in contact with the sensor region 36, that is a temperature approximately equal to the disc temperature, and is outputted at an optimum recording power. If the disc temperature is changed as a function of occasional recording regions of the disc 31, the temperature at the region 36 at this time is instantly sensed by the temperature sensor unit 318, whereby the laser light is outputted at an optimum recording power on the basis of occasional changes in the disc cartridge temperature.

For reproduction and erasures, the laser light is irradiated at all times on the recording surface of the disc 31 at an optimum laser power as a function of the disc temperature. Thus there is no risk of demagnetization of recorded information or incomplete erasure, so that satisfactory data recording and/or reproduction is assured.

It will be seen from above that, with the recording and/or reproducing apparatus recording to a first aspect of the present invention, since a temperature sensor unit for detecting the cartridge temperature is provided in contact with the cartridge proper, or a temperature sensor unit is provided on a member contacting with the cartridge proper, the laser power may be controlled to an occasionally optimum value during recording, reproduction and erasure on the basis of the sensed temperature for realizing stable recording, reproduction and erasure of information signals.

Above all, for recording or reproducing signals on or from a magneto-optical disc, the readout position of the magnetic head may be controlled on the basis of the sensed cartridge temperature for realizing accurate magnetic head positioning.

With the disc cartridge according to the second aspect of the present invention, since at least part of the outer surface of the cartridge proper is formed of the same material as that of the substrate of the recording medium, the temperature of the recording medium accommodated within the cartridge proper may be grasped from the cartridge temperature on loading the disc cartridge on a recording and/or reproducing apparatus according to a third aspect of the present invention.

On the other hand, since no orifice or the like for temperature detection is provided in the present disc cartridge, the recording medium may be protected against contamination by foreign matter, such as dust and dirt.

Finally, with the recording and/or reproducing apparatus according to the third aspect of the present invention, since the temperature sensor unit is provided for contacting with and sensing the temperature of a region of the disc cartridge which is formed of the same material as the substrate of the recording medium of the disc cartridge, on loading the disc cartridge, the temperature of the sensed region that is of the recording medium, may be grasped instantaneously. The laser power may be controlled on the basis of the sensed temperature for achieving satisfactory recording and/or reproduction of information signals on or from the recording medium.

What is claimed is:

1. A recording and/or reproducing apparatus for recording and/or reproducing information signals on or from a disc rotatably mounted within a disc cartridge, the disc cartridge having a recording layer, the apparatus including means for rotating the disc relative to the disc cartridge and light source means for directing a radiation beam onto the recording layer of the disc as the disc rotates, wherein the information signals can be recorded on or reproduced from the recording layer due to interaction between the beam and the recording layer,
wherein the improvement comprises:
temperature sensor means for sensing a temperature of the disc cartridge and for generating a temperature signal which corresponds to the temperature;
computing and controlling means for receiving the temperature signal and controlling the light source means in response to the temperature signal; and
support member means connected to the temperature sensing means for positioning the temperature sensor means in thermal contact with the disc cartridge when the disc cartridge is loaded into the recording and/or reproducing apparatus.

2. The recording and/or reproducing apparatus according to claim 1 comprising positioning means for positioning said disc cartridge in engagement with means for rotating the disc, wherein the temperature sensor means senses a temperature of the disc cartridge when the disc cartridge has been positioned in engagement with the means for rotating the disc by the positioning means.

3. The recording and/or reproducing apparatus according to claim 2 wherein said temperature sensor means abuts on said disc cartridge positioned by said positioning means.

4. The recording and/or reproducing apparatus according to claim 2 wherein said temperature sensor means is provided on said positioning means.

5. The recording and/or reproducing apparatus of claim 2 wherein a portion of the disc is composed of a first material and a portion of the disc cartridge is composed of the first material, and wherein the temperature sensor means senses a temperature of said portion of said disc cartridge.

6. The recording and/or reproducing apparatus of claim 1 wherein the support member means comprises a height position setting pin means for supporting the disc cartridge.

7. The recording and/or reproducing apparatus of claim 1 wherein the support member means comprises a positioning pin means for fixing relative position of the disc cartridge and the light source means.

8. The recording and/or reproducing apparatus of claim 1 wherein the support member means comprises:
a chassis; and
compression spring means attached to the chassis and to the temperature sensor means for positioning the temperature sensor means in thermal contact with a portion of the disc cartridge,
wherein the portion of the disc cartridge is formed from a first material and a portion of the disc is formed of the first material.

9. A recording and/or reproducing apparatus for recording and/or reproducing information signals on or from a disc rotatably mounted within a disc cartridge, the disc cartridge having a recording layer, the apparatus including means for rotating the disc relative to the disc cartridge and light source means for directing a radiation beam onto the recording layer of the disc, wherein the information signals can be recorded on or reproduced from the recording layer due to interaction between the beam and the recording layer,
wherein the improvement comprises:
a member in thermal contact with the disc cartridge when the disc cartridge is loaded into the recording and/or reproducing apparatus;
temperature sensor means in thermal contact with the member for sensing a temperature of the member and for generating a temperature signal which corresponds to the temperature; and
computing and controlling means for receiving the temperature signal and controlling the light source in response to the temperature signal.

10. The recording and/or reproducing apparatus according to claim 9 comprising positioning means for positioning said disc cartridge in engagement with means for rotating the disc, wherein the temperature sensor means is provided on the positioning means.

11. The recording and/or reproducing apparatus according to claim 9 comprising positioning means for positioning said disc cartridge with respect to said recording and/or reproducing means, wherein the temperature sensor means senses a temperature of the member when the disc cartridge is positioned by the positioning means.

12. The recording and/or reproducing apparatus according to claim 11 wherein the temperature sensor means abuts the member.

13. The recording and/or reproducing apparatus of claim 9 wherein the member comprises a material having a heat conductivity substantially equivalent to or greater than that of glass or copper.

14. The recording and/or reproducing apparatus of claim 9 wherein the member comprises a height position setting pin means for supporting the disc cartridge.

15. The recording and/or reproducing apparatus of claim 9 wherein the member comprises a positioning pin means for fixing relative position of the disc cartridge and the light source means.

* * * * *

REEXAMINATION CERTIFICATE (2775th)
United States Patent [19]
Ohmori et al.

[11] B1 5,182,742

[45] Certificate Issued Jan. 16, 1996

[54] RECORDING AND/OR REPRODUCING APPARATUS WITH A DISC CARTRIDGE TEMPERATURE SENSOR

[75] Inventors: Kiyoshi Ohmori, Kanagawa; Shoji Iwaasa, Tokyo; Goro Fujita, Kanagawa, all of Japan

[73] Assignee: Sony Corporation, Tokyo, Japan

Reexamination Request:
No. 90/003,681, Jan. 3, 1995

Reexamination Certificate for:
Patent No.: 5,182,742
Issued: Jan. 26, 1993
Appl. No.: 726,779
Filed: Jul. 8, 1991

[30] Foreign Application Priority Data

Jul. 10, 1990 [JP] Japan ................................ 2-180611

[51] Int. Cl.$^6$ .................... G11B 33/02; G11B 7/00; G11B 33/14
[52] U.S. Cl. .................... 369/116; 369/33; 369/77.2; 360/97.02
[58] Field of Search .................... 369/116, 291, 369/75.1, 75.2, 77.1, 77.2, 54, 58, 272, 288, 292, 291, 120, 100, 33; 360/131, 132, 133, 135, 97.02, 97.03, 97.04

[56] References Cited

U.S. PATENT DOCUMENTS

| 4,056,831 | 11/1977 | Godbaut et al. | 360/77.02 |
| 4,731,680 | 3/1988 | Moriyama et al. | 360/99.08 |

FOREIGN PATENT DOCUMENTS

| 099005 | 1/1984 | European Pat. Off. . |
| 1-191326 | 8/1988 | Japan . |
| 1-101325 | 8/1989 | Japan . |
| 1-196732 | 8/1989 | Japan . |

*Primary Examiner*—Georgia Yvonne Epps

[57] ABSTRACT

A recording and/or reproducing apparatus into which a disc cartridge accommodating a disc is loaded and in which information signals are adapted to be recorded on or reproduced from the disc. A temperature sensor is provided within the apparatus for contacting with and sensing the temperature of the disc cartridge. By this temperature sensor, the temperature of the loaded disc cartridge is sensed and an output of a light source of an optical head is controlled on the basis of the sensor output to effect recording and/or reproduction of the information signals under an optimum operating state.

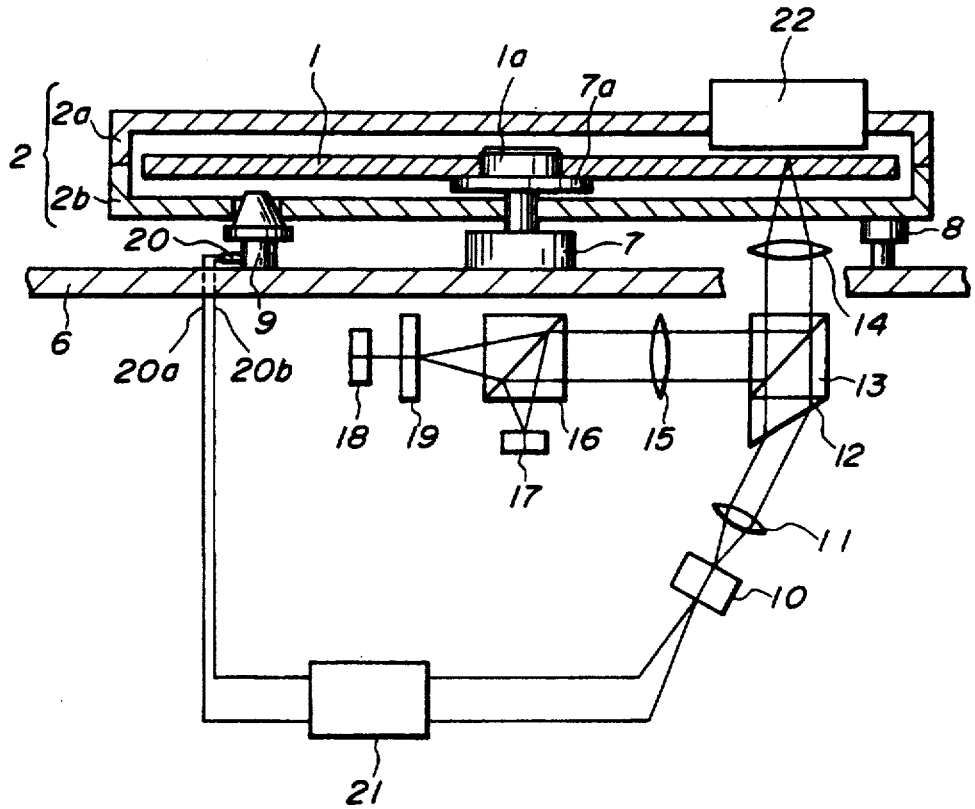

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–15 is confirmed.

Claims 3 and 8 are cancelled.

Claims 1–2 and 4 are determined to be patentable as amended.

Claims 5–7 dependent on an amended claim, are determined to be patentable.

1. A recording and/or reproducing apparatus for recording and/or reproducing information signals on or from a disc rotatably mounted within a disc cartridge, the disc cartridge having a recording layer, the apparatus including means for rotating the disc relative to the disc cartridge and light source means for directing a radiation beam onto the recording layer of the disc as the disc rotates, wherein the information signals can be recorded on or reproduced from the recording layer due to interaction between the beam and the recording layer, wherein the improvement comprises:

temperature sensor means for sensing a temperature of the disc cartridge and for generating a temperature signal which corresponds to the temperature;

computing and controlling means for receiving the temperature signal and controlling the light source means in response to the temperature signal; and support member means [connected to the] *for contacting and supporting said cartridge when said cartridge is loaded into said recording and/or reproducing apparatus, said* temperature [sensing] *sensor* means [for positioning the temperature sensor means in thermal contact with the disc cartridge when the disc cartridge is loaded into the recording and/or reproducing apparatus] *being in thermal contact with said support member means for sensing a temperature of the support member means when it is in contact with said cartridge.*

2. The recording and/or reproducing apparatus according to claim 1 [comprising] *wherein said support member means comprises* positioning means for positioning said disk cartridge in engagement with said means for rotating the disk, wherein the temperature sensor means senses a temperature of *the* disk cartridge *by sensing the temperature of said positioning means* when the disk cartridge has been positioned in engagement with the means for rotating the disk by the positioning means.

4. The recording and/or reproducing apparatus according to claim 2 wherein said temperature sensor means is [provided on] *embedded within* said positioning means.

* * * * *